United States Patent [19]

Lann

[11] 3,991,503
[45] Nov. 16, 1976

[54] AUTOMATIC HOOK SETTING FISH ROD HOLDER

[76] Inventor: Claude L. Lann, Kingfisher, Okla. 73750

[22] Filed: Sept. 15, 1975

[21] Appl. No.: 613,670

[52] U.S. Cl. ............................................. 43/15
[51] Int. Cl.² ...................................... A01K 97/00
[58] Field of Search .............................. 43/15, 16

[56] References Cited
UNITED STATES PATENTS

| | | | |
|---|---|---|---|
| 2,766,543 | 10/1956 | Beck | 43/16 |
| 2,799,111 | 7/1957 | Voboril | 43/15 |
| 2,810,981 | 10/1957 | Littau | 43/16 |
| 2,851,812 | 9/1958 | Beck | 43/15 |
| 3,562,947 | 2/1971 | Martin | 43/15 |

Primary Examiner—Louis G. Mancene
Assistant Examiner—Daniel J. Leach
Attorney, Agent, or Firm—Sughrue, Rothwell, Mion, Zinn and Macpeak

[57] ABSTRACT

A bowed steel support rod has one end inserted in the ground and the other extending upwardly therefrom. A fishing rod has its butt end fixed to the support rod near the point of insertion in the ground and an intermediate portion is captured within a U-shaped opening of a latch member fixed to the outboard end of the rod and held thereby by a pivotable trigger which overlies the open end of the U-shaped latch member and is frictionally maintained in position. The tension of the fishing line acts on the trigger to pivot the trigger upon the fish striking the lure on the end of the line and rotates the trigger to release the bowed fishing rod which flexes to automatically set the hook.

4 Claims, 6 Drawing Figures

AUTOMATIC HOOK SETTING FISH ROD HOLDER

BACKGROUND OF THE INVENTION

1. Field of the Invention

This invention relates to an automatic hook setting fishing rod holder, and more particularly, to a simplified mechanism for maintaining the rod bent into releasable, hook-setting position and wherein a trigger responsive to line tension releases the rod to set the hook.

2. Description of the Prior Art

Fishing rod holders have been employed for many years to support a fishing rod in an inclined position from the vertical and for maintaining the outboard end of the rod flexed or bent to facilitate hooking of the fish upon the release of the rod from its bowed or bent position. Such devices have been relatively complicated and expensive and require rather complex means for maintaining the fishing rod in bowed position, and for permitting upon an increase in tension of the line carried by the rod the release of the rod from its bowed position and to effect hooking of the fish on the end of the line remote from the fishing rod and the rod holder. Such devices have further disadvantages in that they do not readily adapt to different size rods and do not permit adjustments of the trigger mechanism releasing the rod from the bowed position.

SUMMARY OF THE INVENTION

The present invention relates to an improved automatic hook setting fishing rod holder for a fishing rod having a butt end and a tip end and carrying a reel at the butt end with a fish line extending from the reel at the butt end to the tip end through guides. The fish rod holder comprises an elongated bowed metal fishing rod support rod, one end of the bowed support rod having means permitting the rod to be pushed into the ground with that end generally vertical and the outboard end of the bowed rod generally parallel to the ground. A fishing rod handle holding member is fixedly carried by the support rod near the end projecting into the ground for holding the handle or butt end of the fishing rod adjacent to the support rod. A U-shaped latch member fixed to the outboard end of the support rod receives a portion of the rod intermediate of the butt and tip ends, said member having a U-shaped recess which faces upwardly and away from the ground. A fish hook setting trigger in the form of a thin metal strip is pivoted to the U-shaped latch member to one side of the U-shaped recess and has a first portion which extends across the open end of the recess and in frictional engagement with one end of the U-shaped latch member to lock the rod portion within the recess and the fishing rod bent in conformance with the support rod. A second portion of the trigger strip extends beyond the pivot axis away from that portion spanning the U-shaped recess and carries one or more standard dowels or pins which engage the fish line extending from the reel to the tip end of the fishing rod, whereby increase in line tension as the fish attacks the bait forces the trigger to pivot overcoming the frictional resistance offered by the end of the U-shaped latch member to the trigger causing the trigger to release the bowed fishing rod and to automatically hook the fish upon straightening of the bowed portion of the fishing rod.

The U-shaped latch member comprises preferably a U-shaped plate terminating at its upper ends in right angle projections which define a flat mounting surface for the pivoted trigger and a flat friction contact surface for the first end of said setting trigger. The plurality of upright pins mounted to the trigger strip on the second portion of the setting trigger permits the fishing line to pass around opposite sides of said pins, respectively, whereby increased line tension causes said trigger strip to rotate about the pivot axis to release the bowed fishing rod.

DESCRIPTION OF THE PREFERRED EMBODIMENT

Figure 1:
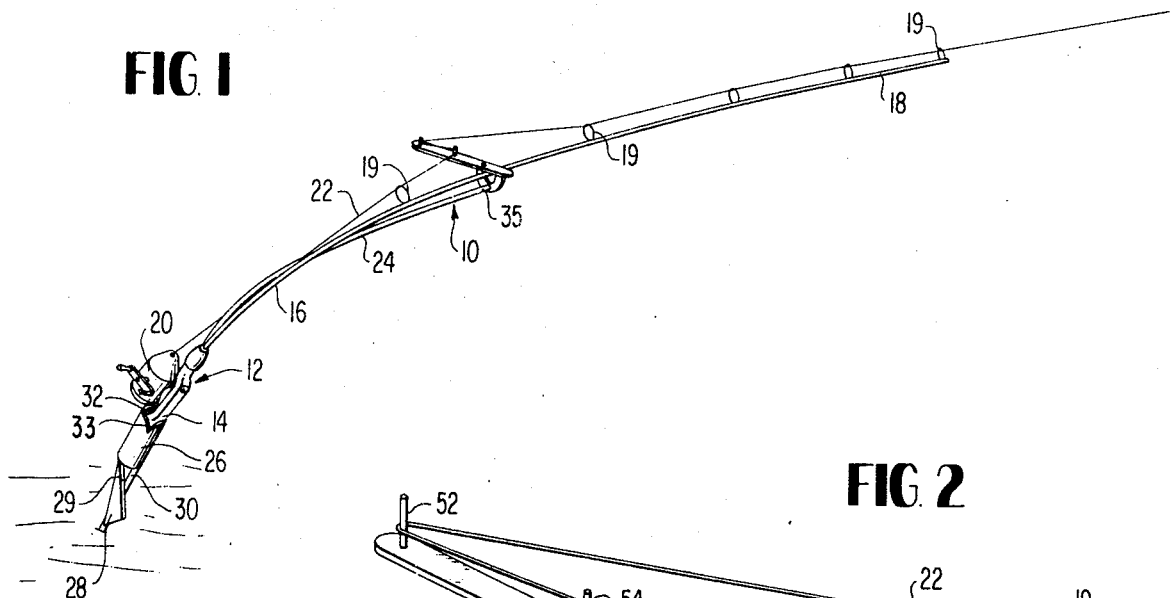
FIG. 1 is a perspective view of the improved automatic hook setting fishing rod holder of the present invention with a fishing rod coupled thereto and maintained bowed in conformance to the support rod with the trigger in trigger set position.

FIGS. 1–5 inclusive show a preferred embodiment of the invention under one of a number of types of trigger setting. In this respect, the invention comprises an automatic hook setting fish rod holder identified generally at 10 and shown in FIG. 1 as supporting or holding a fishing rod identified generally at 12 having a handle or butt end 14 from which extends a fiberglass or bamboo rod portion 16 whose tip portion 18 extends well beyond the end of fishing rod holder 10. At the butt end 14 or handle portion of the fishing rod 12, there is mounted a reel 20 from which a line 22 extends passing through a plurality of guides 19 spaced along the length of the rod portion 16 of the fishing rod and fixed thereto.

The automatic hook setting fishing rod holder 10 which may be formed of metal or plastic parts, is preferably formed of a bowed steel rod indicated generally at 24 which may be approximately 3 feet long and formed of steel rod stock, ¼ inch, 5/16 inch, or ⅜ inch in diameter, as desired. The rod 24 carries near its lower end 30 and just above a triangular sheet metal plate or spade 28 welded to the side of the rod 24, a fish rod handle or butt end support pipe 26, which is hollow and which has at its upper end 32 a notch 33 on one side which may receive reel 20. The triangular plate or spade 28 permits the operator to place his foot on its upper edge 29 and force the pointed tip end into the ground to securely plant the lower end 30 of the support rod 24 into the ground. The support rod 24 is bowed such that its outboard end 35 is almost but not quite parallel to the ground receiving the same. The outboard end 35 of the support rod terminates in a U-shaped fishing rod latch member 34 formed of sheet metal including a U-shaped base 36 terminating in ends or projections 38 and 40 which are bent generally at right angles to base 36 forming a U-shaped recess 42. One projection 40 of member 34 forms a frictional locking surface 39 while the other right angle projection 38 supports a pin 44 which defines the pivot axis of trigger shown generally at 46 in the form of an elongated metal strip, pivotably mounted intermediate of its ends but close to one end, forming a short length portion 48 which spans recess 42 and frictionally engages the friction surface or face 39 of projection 40 to lock or restrain the trigger 46 from pivoting about the axis of pivot pin 44. Trigger portion 50 carries a pair of upright pins or dowels 52 and 54 fixedly mounted to the upper face of the strip at points remote from pivot axis defined by pin 44. The pins or dowels 52 and 54 act to define a diversion path for the line 22 away from the fishing rod portion 16 as it extends between guides 19 to each side of member 34, see FIG. 2.

Figure 2:
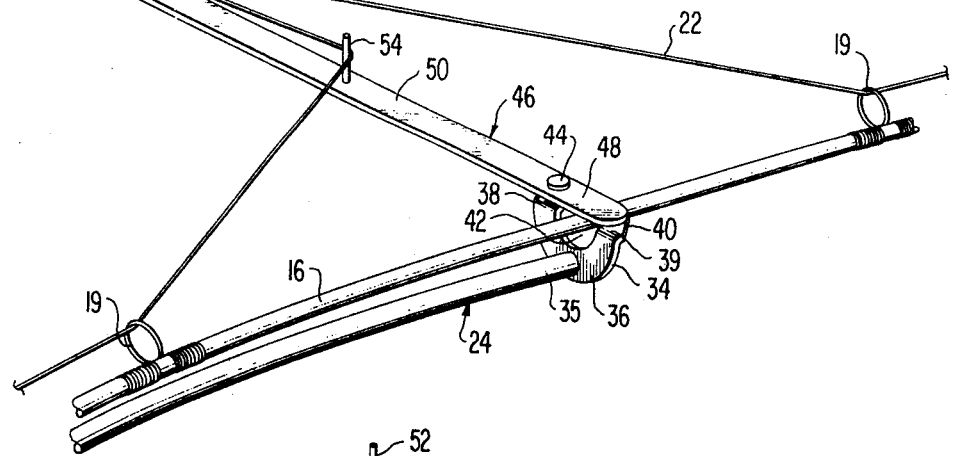
FIG. 2 is an enlarged, fragmentary, perspective view of the trigger portion of the fishing rod holder of FIG. 1 under trigger set conditions.
Figure 3:
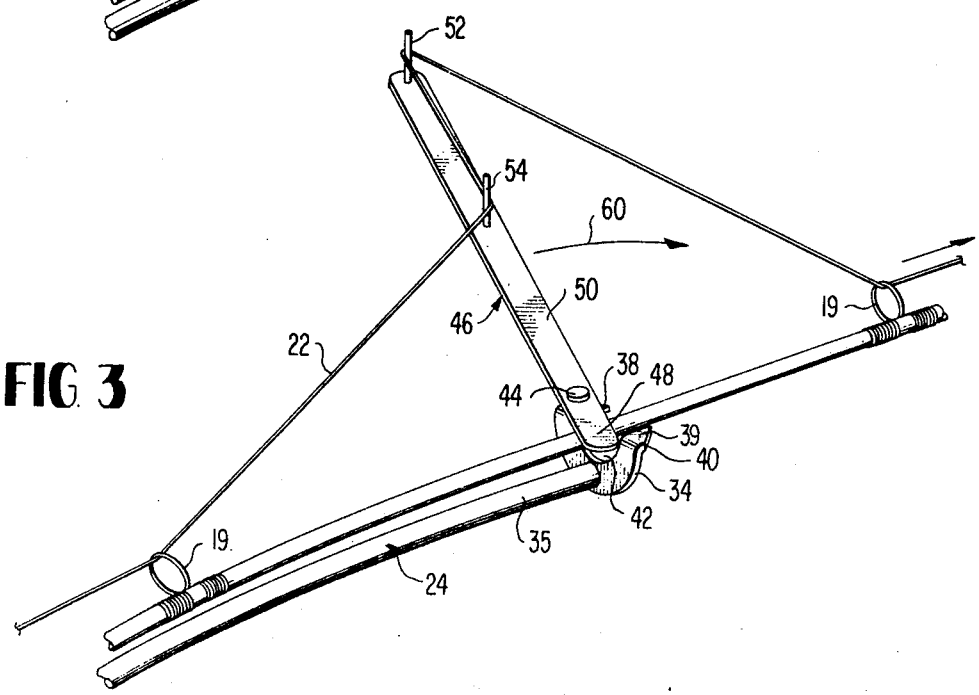
FIG. 3 is a fragmentary perspective view similar to that of FIG. 2 at the moment of trigger release.
Figure 4:
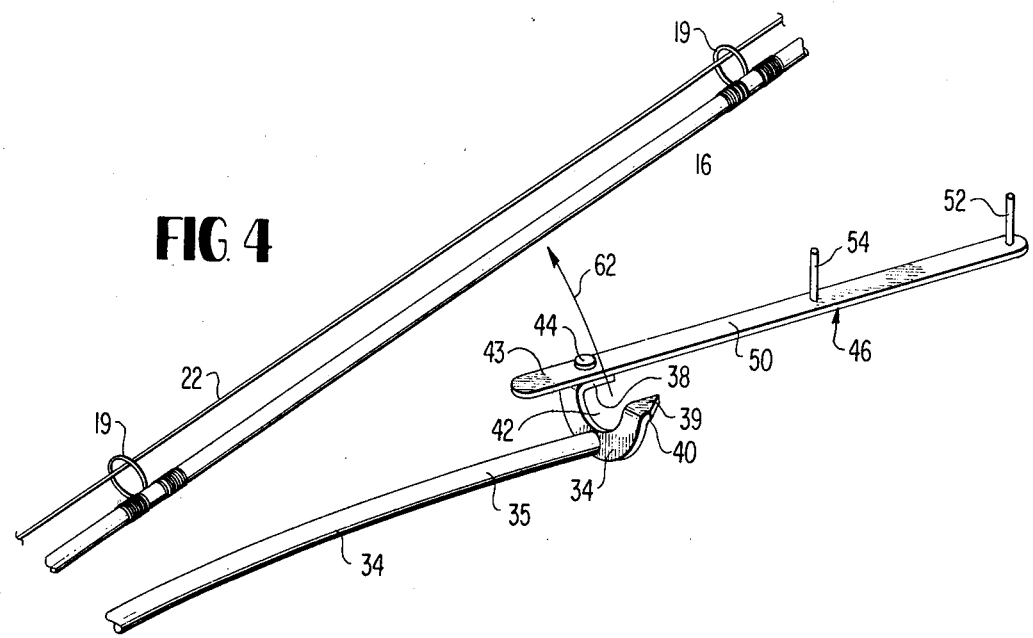
FIG. 4 is a further, fragmentary perspective view of the portion of the rod holder and rod shown in FIGS. 2 and 3 with the trigger in full release position and the rod straightened to accomplish setting of the fish hook.
Figure 5:
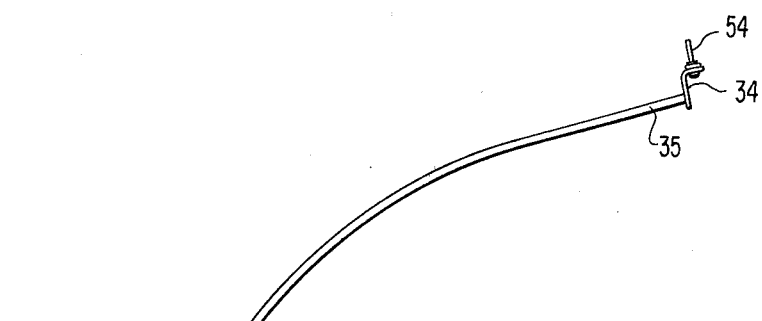
FIG. 5 is a side elevational view of the improved automatic hook setting fish rod holder of the present invention shown in FIG. 1.

As may be seen in contrasting FIGS. 2, 3 and 4, the fishing rod holder 10 is set up such that the handle or butt end of the rod 12 is received within the tube or pipe 26, the outboard portion of the fishing rod is bowed in conformance with bowed configuration of the support rod 24 and a portion of the fishing rod 16 intermediate of the tip end 18 and the butt end 14 is positioned within the recess 42 defined by the U-shaped latch member 34 and the trigger is pivoted to a position where portion 48 straddles recess 42 and is in frictional contact with friction surface 39 defined by the right angle projection 40. The fishing rod is securely locked in its bowed condition setting up a spring force by the flexed condition of the rod storing energy which, upon release of the trigger, causes the rod to straighten, the amount of movement of the tip end in straightening acting to move the line 22 sufficiently to automatically set the hook (not shown) at the outboard end of the line. All of this is accomplished by the fish biting on the bait attached to the hook. As seen in FIGS. 2 and 3, the fish line 22 as it passes from the reel 20 towards the tip end 18 of the fishing rod, is stretched about the tension dowels or pins 52 and 54, the line 22 being bent to the left as it passes about pin or dowel 54, and being wrapped clockwise about the outboard dowel or pin 52 prior to passing through the next ring guide 19 outboard of the trigger 46. The fish biting on the bait or lure causes an increase in tension on line 22 and causes the trigger 46 to rotate clockwise about pivot pin 44 as seen by the arrow 60, FIG. 3, tending to straighten out and at the same time as further seen in FIG. 4 in sequence, causing the portion 48 of strip 50 to move away from friction surface 39 and open up the recess 42 to release the flexed fishing rod 16 from latch member 34, the extent of this movement from flexed to straightened or unflexed position as shown by arrow 62, FIG. 4, being sufficient to automatically hook the fish.

Figure 6:
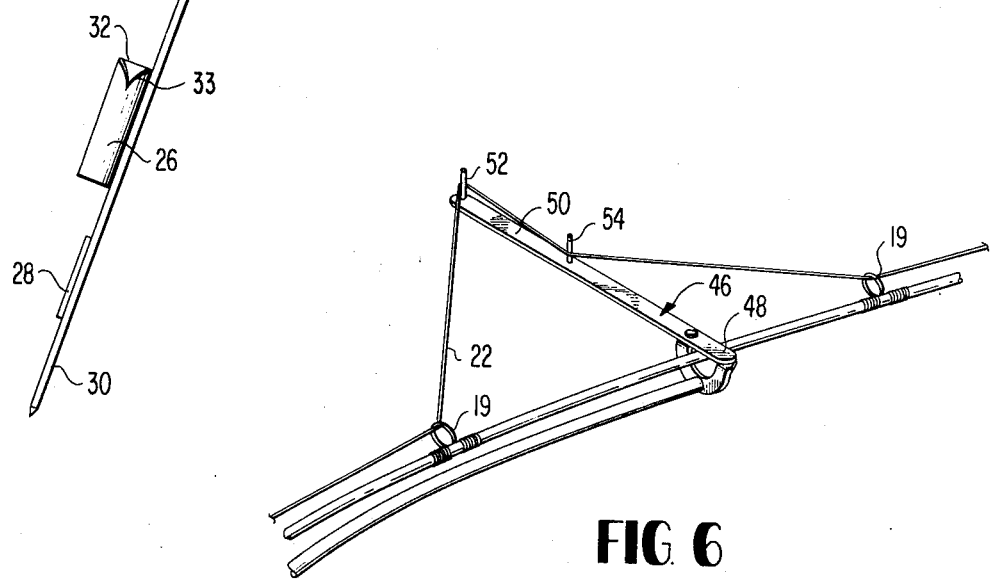
FIG. 6 is a perspective view similar to that of FIG. 2 but showing the fishing line strung on the pins of the trigger strip modified from that of the manner shown in FIGS. 2 and 3.

The simplified automatic hook setting fishing rod holder of the present invention has great versatility both in terms of the size and length of rod that it holds or supports, and the tension required to trigger the release of the rod from its bowed position to its straightened, hook setting position, the sequence being shown in FIGS. 2, 3 and 4. For instance, reference to FIG. 6 shows that the line 22 which extends from the reel 20 passes clockwise, first about the outer pin or tension dowel 52 and then counterclockwise about the inner pin or dowel 54 prior to further extending along the rod portion 16 captured by guides 19. As another variation, this provides for a different tension force necessary to release the fishing rod section 16 from that shown in FIGS. 2, 3 and 4. Additional different trigger settings may be maintained by simply having line 22 pass clockwise about pin 52 or pin 54 without touching the other. Obviously, the force acting through the line 22 on the pin 54 is transmitted by way of the pivot pin 44 to the friction engagement area between the right angle projection 40 and the portion 48 of the trigger 46. Further, while the steel support rod forming the basic element of the automatic hook setting fishing rod holder of the present invention has been stated as preferably being approximately 3 feet long and formed of ¼ inch, 5/16 inch or ⅜ inch steel rod stock, the dimensions and size of this member may be readily varied. Furthermore, while the U-shaped latch member 34 may be cut from a ⅝ inch washer whose ends are bent over to form projections 38 and 40, obviously this member may be formed from other than a metal washer and of different size and of different material. Typically, the hook setting trigger 46 is formed of metal strap material and may be 7 inches in length, ⅛ inch in thickness and ½ inch in width. Variations may be made without differing from the invention. The dowels 52 and 54 are preferably ¾ inch in length and formed of a ⅛ inch diameter material, the pipe 26 may be formed on 1 inch pipe stock cut to a 4 inch length and mounted approximately 8 inches up from the bottom by welding the same to the side of the steel rod 24. The spade or plate 28 may be formed of triangular steel plate ⅛ inch in thickness in triangular form having a horizontal edge ⅝ inch in width and inclined edges leading therefrom and intersecting approximately 4 inches in length; preferably the triangular spade plate is welded to rod 24 about 3 inches up from the bottom of the rod from the terminal end 30 of the rod.

While the invention has been particularly shown and described with reference to a preferred embodiment thereof, it will be understood by those skilled in the art that various changes in form and details may be made therein without departing from the spirit and scope of the invention.

What is claimed is:

1. An improved automatic hook setting fishing rod holder for a fishing rod having a butt end and a tip end and carrying a reel mounted to the butt end of the fishing rod and having a line extending therefrom along the fishing rod, said fishing rod holder comprising:
    an elongated, bowed support rod,
    means for inserting one end of the support rod into the ground to cause the other end of the rod to bow upwardly therefrom with the outboard end extending generally parallel to the ground,
    a fishing rod butt end holding member fixedly carried by said support rod near the end penetrating the ground, with the fishing rod extending adjacent thereto,
    a latch member fixed to the outboard end of said support rod defining a U-shaped recess facing upwardly for receiving a portion of the rod intermediate of the butt and tip ends, and
    a fish setting trigger pivoted to said member to one side of said U-shaped recess and having a first portion extending across the open end of said recess to frictionally lock said rod portion within said recess with said rod bent in conformance with said bowed support rod, and a second portion extending beyond said pivot axis to the other side thereof, and means carried by said second portion and engaging said fishing line such that increase in line tension causes said trigger to pivot about said pivot pin to release the bent intermediate portion of said fishing rod, and to automatically hook a fish on the line causing said increased tension.

2. The automatic hook setting fishing rod holder as claimed in claim 1, wherein said latch member fixed to the outboard end of said support rod comprises a U-shaped plate mounted to the end of said support rod and extending at right angles thereto, said U-shaped plate terminating at its upper end in right angles projections, one of said projections defining a friction surface contacting said first portion of said setting trigger, and said other projection having said pivot pin fixed thereto for pivotably mounting said setting trigger.

3. The automatic hook setting fishing rod holder as claimed in claim 2, wherein said setting trigger comprises a metal strip pivotably mounted intermediate of its ends to one of said right angle projections, said metal strip carrying at least one pin on the portion of said metal strip to the side of said pivot pin opposite said U-shaped recess and extending upwardly therefrom such that said fishing line in passing about said upright pin causes said metal strip to pivot under increased tension to release said bowed fishing rod portion.

4. The automatic hook setting fishing rod holder as claimed in claim 3, wherein said tension pins comprise two in number spaced longitudinally along the upper surface of said metal strip outwardly of said pivot pin and said line in passing around said pin respectively on opposite sides thereof effects a different setting for said trigger depending upon the initial contact point of the line and said longitudinally spaced pins.

* * * * *